(12) United States Patent
Wyatt

(10) Patent No.: US 9,726,297 B1
(45) Date of Patent: Aug. 8, 2017

(54) PRESSURE RELIEF VALVE FOR RAILROAD TANK CARS

(71) Applicant: Engineered Controls International, LLC, Elon, NC (US)

(72) Inventor: Aaron Dominic Wyatt, Hillsborough, NC (US)

(73) Assignee: Engineered Controls International, LLC, Elon, NC (US)

( * ) Notice: Subject to any disclaimer, the term of this patent is extended or adjusted under 35 U.S.C. 154(b) by 16 days.

(21) Appl. No.: 14/686,180

(22) Filed: Apr. 14, 2015

Related U.S. Application Data

(60) Provisional application No. 61/979,095, filed on Apr. 14, 2014.

(51) Int. Cl.
*F16K 17/04* (2006.01)

(52) U.S. Cl.
CPC ....... *F16K 17/042* (2013.01); *Y10T 137/7734* (2015.04)

(58) Field of Classification Search
CPC ............. F16K 17/042; Y10T 137/7734; Y10T 137/7932
USPC .................................................. 137/540, 542
See application file for complete search history.

(56) References Cited

U.S. PATENT DOCUMENTS

| | | | | |
|---|---|---|---|---|
| 452,360 | A | * | 5/1891 | Burnham ................ F16K 19/00 137/467 |
| 5,417,143 | A | | 5/1995 | Pasek |
| 6,068,022 | A | * | 5/2000 | Schultz ................ F02M 37/025 137/538 |
| 7,857,398 | B2 | | 12/2010 | Spadaccini et al. |
| 2004/0118453 | A1 | | 6/2004 | Staranchuk |
| 2009/0179168 | A1 | * | 7/2009 | Sinka .................. F16K 31/1221 251/176 |

FOREIGN PATENT DOCUMENTS

| | | |
|---|---|---|
| EP | 134667 A3 | 12/1987 |
| WO | 2013074047 A3 | 7/2013 |

* cited by examiner

*Primary Examiner* — Craig Schneider
*Assistant Examiner* — P. Macade Nichols
(74) *Attorney, Agent, or Firm* — Neal, Gerber & Eisenberg LLP

(57) ABSTRACT

A relief valve configured to allow content held within a vessel to be release under pressure is disclosed. The relief valve is configured to expose a release outlet when pressure within the vessel exceeds a release pressure, and the relief valve is further configured to maintain exposure of the release outlet after pressure within the vessel falls below the release pressure.

22 Claims, 7 Drawing Sheets

PRESSURE RELIEF VALVE FOR RAILROAD TANK CARS

PRIORITY STATEMENT

This application claims benefit to U.S. Provisional Patent Application No. 61/979,095 filed Apr. 14, 2014, the entirety of which is hereby incorporated by reference herein.

BACKGROUND

Relief valves are used to control or limit the pressure in a system or vessel which can build up by a process upset or fire in the vessel. In particular, relief valves are used on vessels such as tank cars carrying commodities like ethanol or crude oil to allow the pressurized contents to flow from the relief valve in the event of a fire or other system failure. Present relief valves used with railroad tank cars open when the pressure in the vessel rises above a predetermined amount, but such valves do not remain open after the initial quick release in pressure. In these valves, the poppet of the valve re-seats when the initial quick release in pressure is achieved, thus not allowing additional pressure or contents to be relieved from the vessel. The present relief valve solves the existing limitations.

SUMMARY

A pressure relief valve is disclosed for controlling or limiting the pressure in a vessel which can build up by a process upset or fire. More specifically, a pressure relief valve is disclosed for use with a railroad tank car carrying commodities such as ethanol or crude oil that will allow a full emptying of the vessel's contents when the vessel is involved in a fire, allowing all contents of the vessel to be emptied before failure of the container. The present disclosure provides a mechanism whereby once the relief valve opens at the preset pressure, it will remain held open at a predetermined height. The relief valve is a direct spring-loaded valve designed to open at a preset pressure. When the pressure in the system or vessel exceeds this preset pressure, the relief valve will open first to a full open position to allow the pressure in the system to be reduced, and then remain held open at a pre-determined height. The opening of the relief valve in the full open position using the momentum of the poppet allows the contents to flow out at a higher rate to allow maximum flow capacity through the relief valve. Then, as the pressure within the vessel decreases below the preset pressure, the relief valve returns to a locked but still open position at a predetermined height so that content can continue to flow out of the vessel. The spring-actuated mechanism locks a stem of the relief valve, and one or more locking pins are released into a recess in the stem so as not to allow the relief valve to close beyond the height of the recess. This allows the relief valve to remain open and continually release the contents of the vessel even though the pressure in the vessel drops below the preset pressure of the valve. By allowing the relief valve to remain open after the pressure within the vessel falls below the preset pressure, an added benefit of preventing, at least in part, the vessel from rupturing may also be realized. A further advantage of allowing remote or direct release of the relief valve in the event that it is determined the valve no longer needs to be held open in the locked position is also disclosed.

According to some embodiments, a relief valve for use with a vessel is disclosed. The relief valve may comprise an inlet portion capable of being coupled to the vessel; a stem; a poppet coupled to the stem and having a valve seat engaged to the inlet portion, the poppet configured to translate to a plurality of open positions where the valve seat is disengaged from the inlet portion to enable content to flow through the inlet portion into the relief valve, and translate to a closed position where the valve seat is engaged to the inlet portion to prevent flow into the relief valve; a bias member disposed configured to exert a bias force against the poppet to retain the poppet in the closed position and prevent the valve seat from disengaging from the inlet portion when the bias force is greater than a release pressure at the inlet portion; and a locking assembly configured to hold the poppet in at least a first open position of the plurality of open positions when the release pressure drops below the bias force.

According to some embodiments, a relief valve capable of being coupled to a vessel is disclosed. The relief valve may comprise an inlet portion; a stem; a poppet coupled to the stem and having a valve seat engaged to the inlet portion, the poppet movable between an open position where the valve seat is disengaged from the inlet portion to enable content to flow through the inlet portion, and a closed position where the valve seat is engaged to the inlet portion to restrict flow through the inlet portion; a spring disposed around the stem, the spring configured to exert a spring force against the poppet to prevent the poppet from translating to the open position when the spring force is greater than a release pressure within the vessel; and a locking assembly configured to retain the poppet in the open position once it has moved to the open position, even when the release pressure drops below the spring force; wherein the poppet is configured to translate to the open position when the release pressure is greater than the spring force.

Other objects, advantages, features, properties and relationships will be obtained from the following detailed description and accompanying drawings which set forth illustrative embodiments that are indicative of the various ways in which the principles of the invention may be employed.

DETAILED DESCRIPTION

The description that follows describes, illustrates and exemplifies one or more embodiments of the present invention in accordance with its principles. This description is not provided to limit the invention to the embodiments described herein, but rather to explain and teach the principles of the invention in order to enable one of ordinary skill in the art to understand these principles and, with that understanding, be able to apply them to practice not only the embodiments described herein, but also other embodiments that may come to mind in accordance with these principles. The scope of the present invention is intended to cover all such embodiments that may fall within the scope of the appended claims, either literally or under the doctrine of equivalents.

Figure 1:
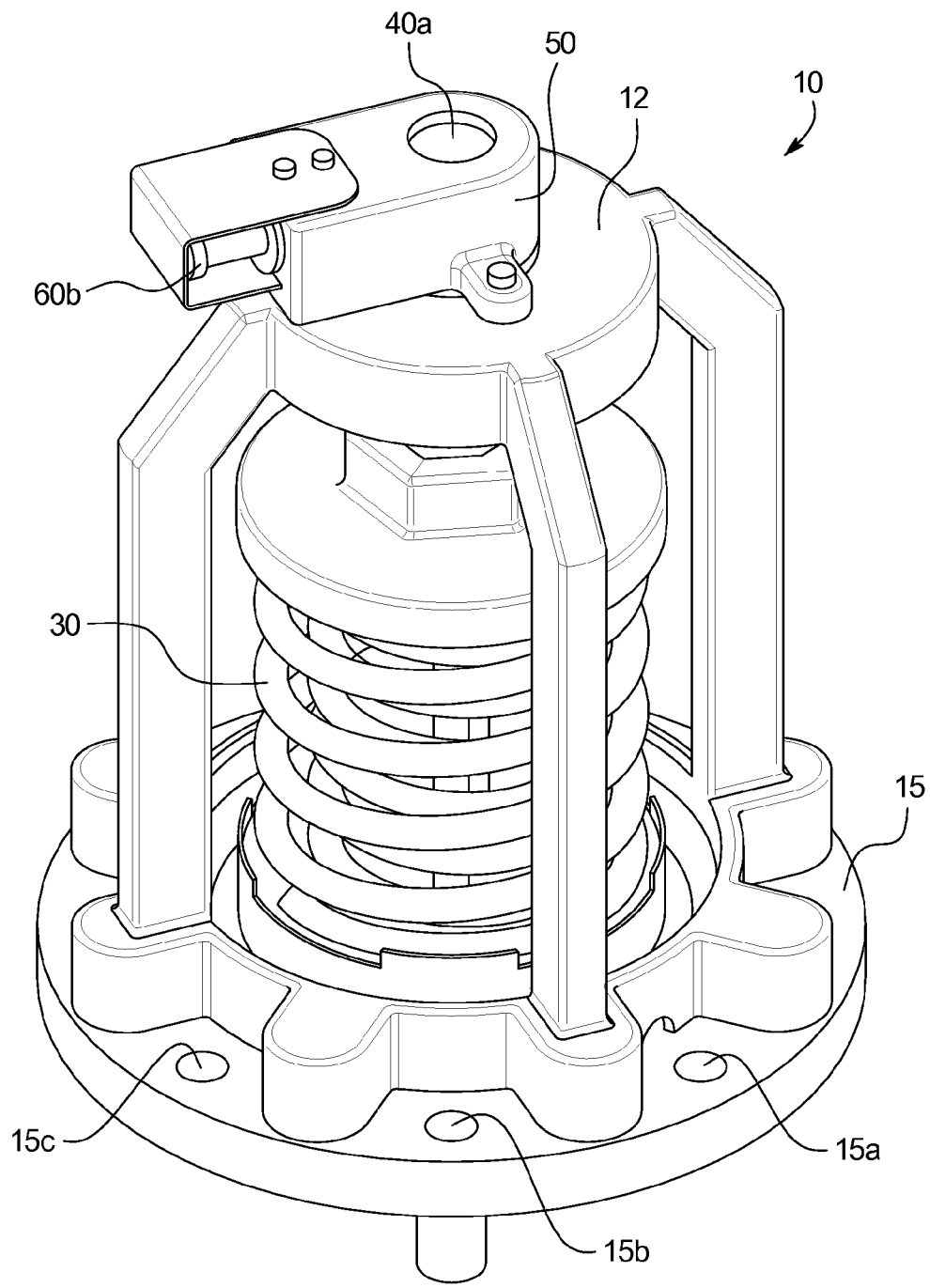
FIG. 1 is a perspective view of a relief valve.
Figure 2:
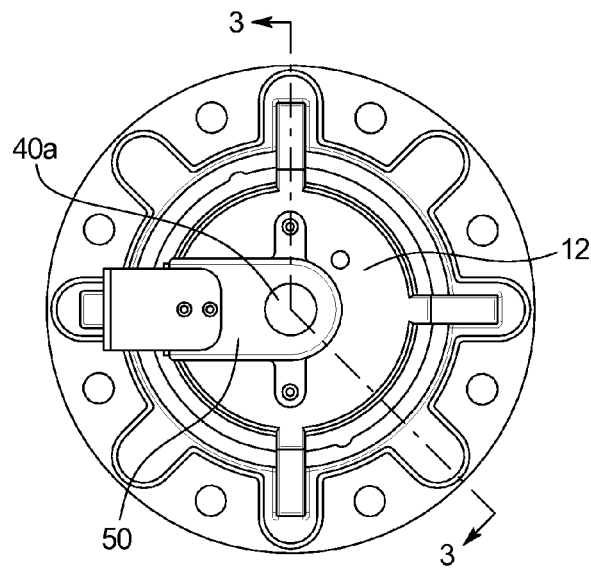
FIG. 2 is top view of the relief valve of FIG. 1.

FIGS. 1-9 illustrates relief valve 10 in accordance with embodiments disclosed herein. The relief valve 10 is a spring-loaded poppet relief-type valve coupled to a vessel (not shown) such as a railroad tank car carrying commodities such as ethanol or crude oil. The relief valve 10 is designed to allow emptying of the vessel's contents when the vessel is involved in a situation (e.g., a fire) that may necessitate emptying most, if not all, contents of the vessel before failure of the container. FIG. 1 illustrates relief valve 10 including a flange mount 15, where relief valve 10 may be attached to an external portion of the vessel by inserting one or more bolts (not shown) through one or more bolt holes 15a, 15b, 15c in order to securely attach the flange mount 15 to the vessel. Additional bolt holes not specifically illustrated may be found around a circumference of flange mount 15.

Figure 3:
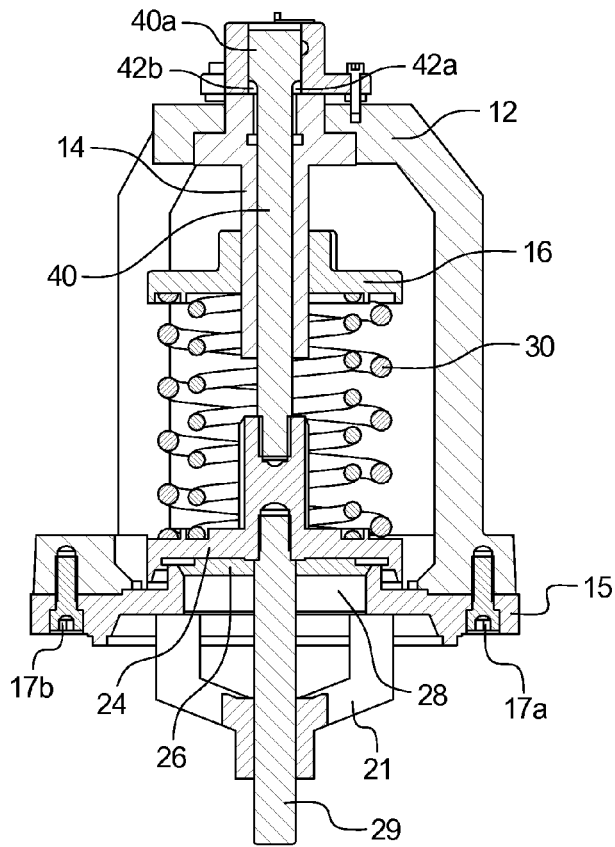
FIG. 3 is a cross-sectional view along Section 3-3 of FIG. 2.
Figure 4:
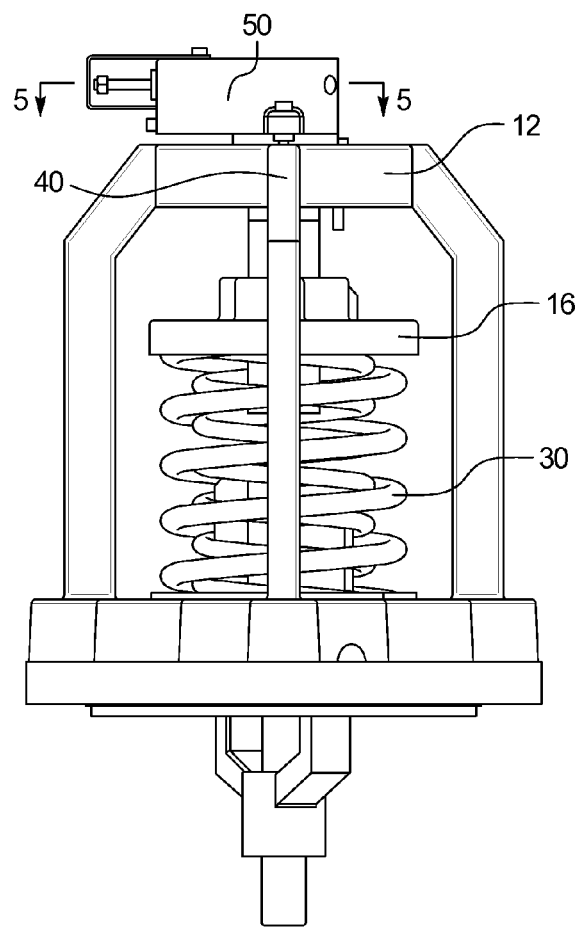
FIG. 4 is a front elevational view of the relief valve of FIG. 1.
Figure 5:
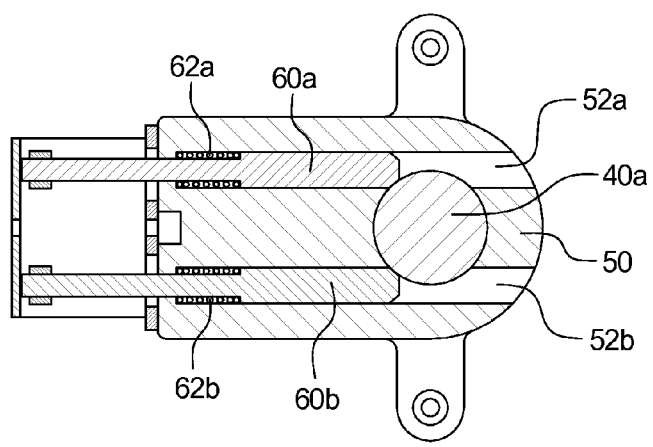
FIG. 5 is a cross-sectional view along Section 5-5 of FIG. 4 depicting a locking assembly of the relief valve.

Valve bonnet 12 includes a top portion supporting a pin housing 50, a plurality of leg portions, and a bottom portion securely attached to flange mount 15. The bottom portion of valve bonnet 12 may be securely attached to flange mount 15 by one or more bolts 72a, 72b as illustrated in FIG. 3. Valve bonnet 12 provides support for relief valve 10 under pressure from, among other forces, a bias force from a bias member, and in this embodiment spring pressure from spring 30, which is depicted as a nested spring assembly.

The relief valve 10 is designed to open at a preset pressure, such that when the pressure in the vessel exceeds the preset pressure of the relief valve 10, the relief valve 10 will open to allow the pressure in the vessel to be reduced. The preset pressure can be adjusted using an adjusting screw 14 to adjust the spring retainer 16 enclosing the top of a spring 30 to translate up or down relative to a stem 40. Adjusting the adjusting screw 14 causes the spring retainer 16 to translate up or down stem 40, and a compression force of spring 30 may be controlled to achieve a specific compression force that corresponds to a desired preset pressure for the particular vessel and/or contents. For example, by turning adjusting screw 14 to translate spring retainer 16 further down stem 40, spring 30 is further compressed resulting in an increased spring force of spring 30 which corresponds to a higher adjusted desired preset pressure. Conversely, by turning adjusting screw 14 to translate spring retainer 16 further up stem 40, spring 30 is further decompressed resulting in a lower spring force of spring 30 which corresponds to a lowered adjusted desired preset pressure. When the pressure in the vessel exceeds the preset pressure, the force of the pressure in the vessel overcomes the spring force of spring 30, allowing a poppet 24 coupled to a seat 26 to lift away from valve inlet 28. Prior to the pressure within the vessel overcoming the spring force of spring 30, seat 26 securely covers valve inlet 28 to prevent content inside the vessel from flowing out valve inlet 28. With the movement of seat 26 lifting away from valve inlet 28, an outlet opening is exposed thus allowing content from the vessel to flow out from valve inlet 28.

Relief valve 10 provides an advantage of including a mechanism whereby when the pressure in the vessel exceeds the preset pressure, relief valve 10 opens to a full open position to allow pressure and/or content in the vessel to be release through valve inlet 28. Relief valve 10 further remains held open at a pre-determined height using a locking assembly. As seen most clearly in FIGS. 5-9, stem 40 has a head portion 40a having an increased diameter and circumference compared to other portions of stem 40, resulting in a pair of shoulders 43a, 43b. A locking assembly comprises a pin housing 50 coupled to the top of the valve bonnet 12. Pin housing 50 includes pin tracks 52a, 52b, and pins 60a, 60b slidably coupled to pin housing 50. Pin springs 62a, 62b are coupled to the pins 60a, 60b and to the pin housing 50 to bias pins 60a, 60b toward stem 40 and into a locked position. When relief valve 10 opens at the preset pressure, poppet 24 forces stem 40 upward. A poppet stem 29 engages poppet 24 to guide poppet 24 upwards. Support member 21 is included to provide guidance and support for poppet stem 29 as poppet stem 29 moves up and down. Substantial portions of poppet stem 29 and support member 21 reside within the vessel.

Figure 6:
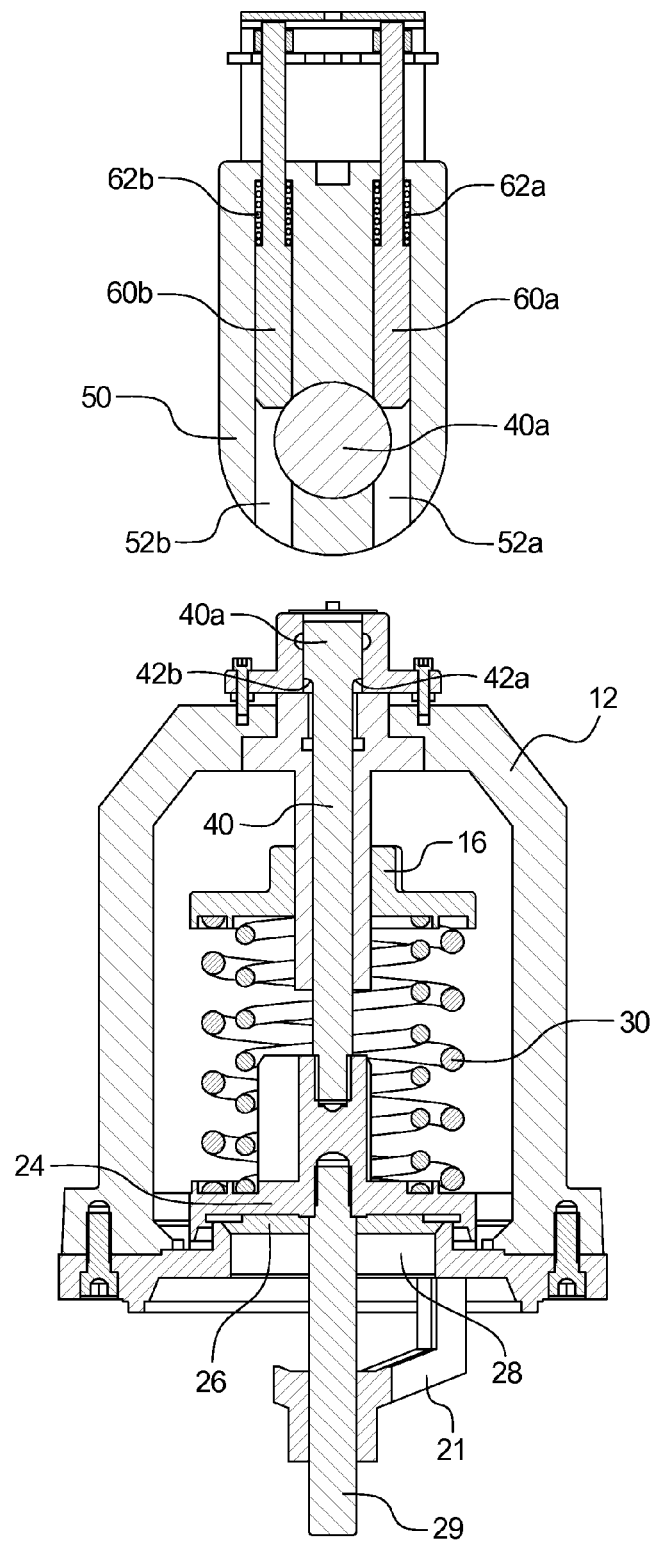
FIG. 6 is a cross-sectional view along Section 3-3 of FIG. 2 and a top view of a locking assembly of the relief valve in a closed position, with the stem of the locking assembly in an unlocked position.
Figure 7:
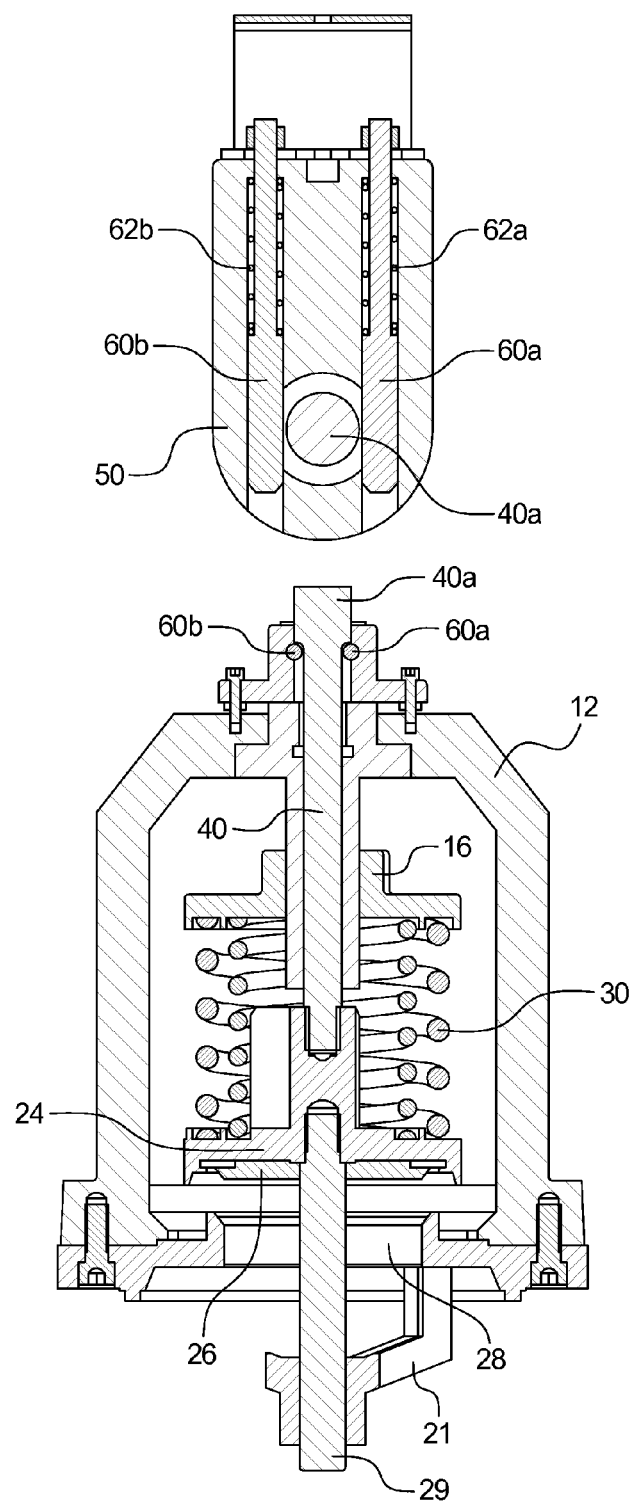
FIG. 7 is a view similar to FIG. 6, with the stem of the locking assembly in a locked position.

FIG. 6 depicts relief valve 10 including recesses 42a, 42b around portions of stem 40, the head portion 40a, and pin housing 50. When stem 40 rises and recesses 42a, 42b align with pins 60a, 60b, the bias of pin springs 62a, 62b forces pins 60a, 60b into recesses 42a, 42b. An end portion of pins 60a, 60b will engage shoulders 43a, 43b through recesses 42a, 42b to lock stem 40 in place, thus preventing stem 40 from lowering to a position where seat 26 can reseal valve inlet 28.

In an unlocked position (FIG. 6), poppet 24 is in seat 26 and stem 40 is in the neutral position. Pins 60a, 60b cannot advance against impeding edges of stem 40 and pin springs 62a, 62b are in a compressed position when in the unlocked position.

In a locked position (FIG. 7), the pressure of the system has overcome the spring force of spring 30, and stem 40 is moved upward away from valve inlet 28 such that poppet 24 and seat 26 uncover valve inlet 28. Recesses 42a, 42b align with pins 60a, 60b, and a bias force from pin springs 62a, 62b push pins 60a, 60b into the recesses 42a, 42b to lock stem 40 in place. This locks relief valve 10 in an open position, with poppet 24 and seat 26 raised from the valve inlet 28 so as not to allow relief valve 10 to close beyond the height of recesses 42a, 42b, thus allowing the contents to continue to flow out of the vessel. This means that relief valve 10 can continue to allow the contents of the vessel to be released from the vessel even though the pressure in the vessel has dropped below the preset pressure of relief valve 10. The vessel may further be saved from rupturing due, at least in part, to the continued release of content from the vessel. This ability for relief valve 10 to continue releasing contents from the vessel below the preset pressure is especially important if the vessel has become comprised (e.g. on fire, or tipped on its side) so that the contents can be released before the vessel fails (e.g. metal fatigue) with contents remaining therein.

Figure 8:
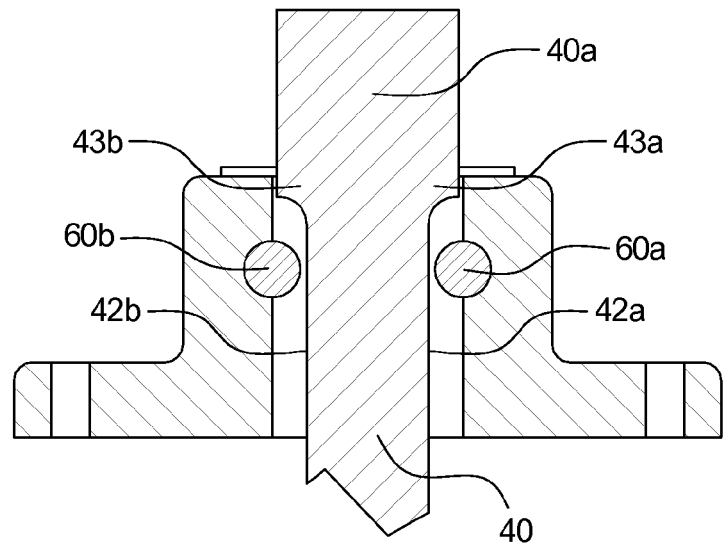
FIG. 8 is a cross-sectional view of a locking assembly of the relief valve in a fully open position with stem of locking assembly above the locked position.
Figure 9:
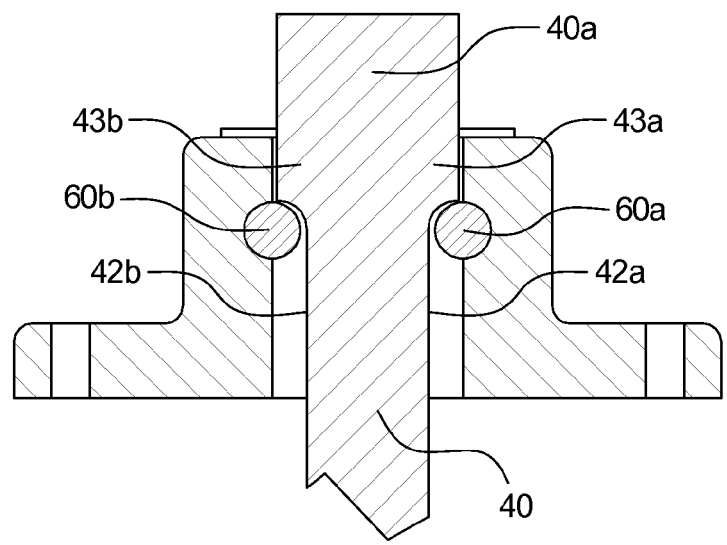
FIG. 9 is a cross-sectional view of a locking assembly of the relief valve in an open position with stem of locking assembly in a locked position.

As seen in FIG. 8, relief valve 10 also provides a further advantage by allowing poppet 24 and seat 26 to rise up to a full open position height that is higher than a locked position height. The poppet 24 and seat 26 may rise to the full open position height when momentum from a pressure within the vessel overcoming the preset pressure forces poppet 24 and seat 26 to rise up to the full open position height. The full open position height is higher that the locked position height, where seat 26 is lifted higher off valve inlet 28 to create a larger outlet opening at the full open position height than compared to when seat 26 is lifted to the locked position height. This allows the contents of the vessel to flow out at a higher rate while the pressure within the vessel is able to maintain poppet 24 and seat 26 at a height above the locked position height for poppet 24 and seat 26. This may allow for maximum flow capacity from the vessel upon the initial opening of relief valve 10. In this case, locking pins 60*a*, 60*b* slip into recesses 42*a*, 42*b* but are below the restricting part of shoulders 43*a*, 43*b* created by head portion 40*a*.

Then, as pressure decreases in the vessel, relief valve 10 returns to the locked open position (FIG. 9) with shoulders 43*a*, 43*b* resting on locking pins 60*a*, 60*b* at the predetermined open height so that pressure can continue to flow out of the vessel and prevent rupturing of the vessel.

Figure 10:
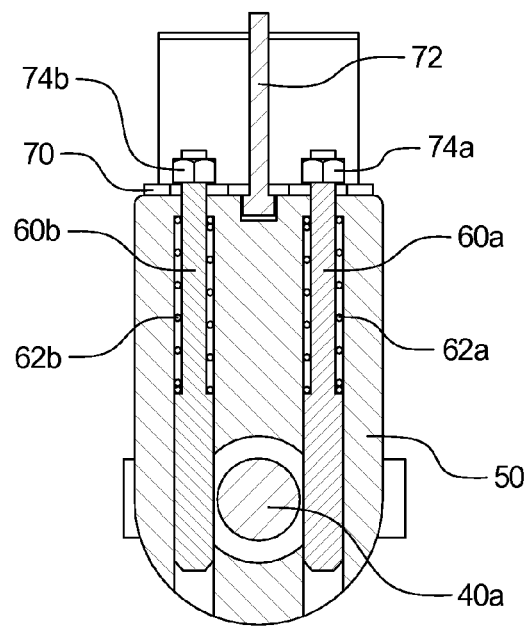
FIG. 10 illustrates a release feature of a relief valve in a first position.
Figure 11:
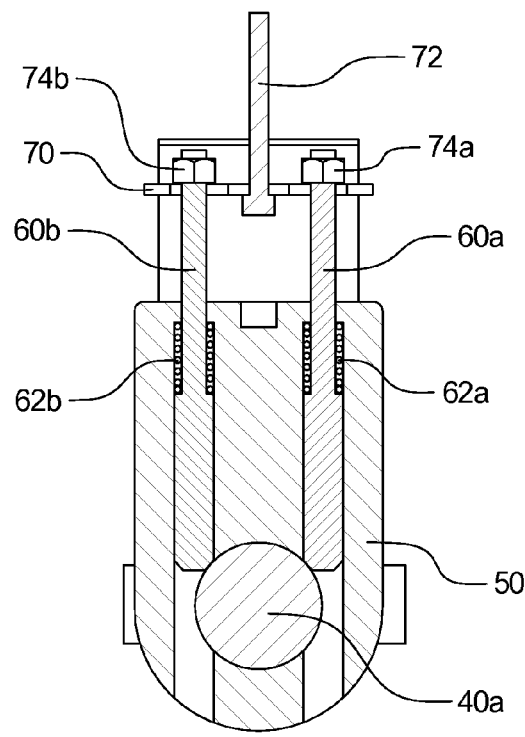
FIG. 11 illustrates the release feature of FIG. 10 in a second position.

In some embodiments, FIGS. 10 and 11 illustrate relief valve 10 including a release feature for releasing the locking mechanism of relief valve 10 in the event that it is determined relief valve 10 no longer needs to be held open because content from the vessel no longer needs, or is desired, to be emptied through relief valve 10 (e.g., the passing of a critical situation such as extinguishing a fire in the vessel). To reset relief valve 10 so that it can reseal valve inlet 28, locking pins 60*a*, 60*b* are pulled back from the locked position (FIG. 10). Linear force is applied to a reset plate 70 by a rod 72. Once the force is applied to reset plate 70, reset plate 70 contacts stops 74*a*, 74*b* that are coupled to locking pins 60*a*, 60*b*. This results in pin springs 62*a*, 62*b* being compressed, and locking pins 60*a*, 60*b* are pulled back to the unlocked position to close relief valve 10 (FIG. 11). Rod 72 may be pulled by any means of applying a liner force, for example a pneumatic piston or a brake cable-type assembly. This allows relief valve 10 to be reset from a remote location. Rod 72 could also have a manual pull to reset relief valve 10 locally.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

What is claimed is:

1. A relief valve for controlling fluid flow comprising:
an inlet portion;
a stem;
a poppet coupled to the stem, the poppet being configured to occupy a plurality of open positions where the poppet is disengaged from the inlet portion to enable fluid flow through the inlet portion into the relief valve, and to occupy a closed position where the poppet engages the inlet portion to prevent fluid flow through the inlet portion into the relief valve;
a bias member configured to bias the poppet toward the closed position; and
a locking assembly configured to prevent the poppet from occupying the closed position;
wherein the inlet portion defines an inlet void configured to accommodate fluid flow, and at least a portion of the poppet is wider than a diameter of the inlet void closest to the poppet.

2. The relief valve of claim 1, wherein the locking assembly comprises one or more pins movable relative to the stem and one or more pin springs biasing the one or more pins toward the stem, wherein the locking assembly is configured to enable the one or more pins to occupy a first position where the one or more pins do not interfere with motion of the poppet and a second position where the one or more pins prevent the poppet from occupying the closed position.

3. The relief valve of claim 2, further comprising a release assembly including:
one or more stops attached to ends of the one or more pins;
a reset plate configured to contact the one or more stops;
wherein, after the one or more pins have occupied the second position, movement of the reset plate away from the stem opposes the biasing forces of the one or more pin springs and causes the one or more pins to move from the second position toward the first position.

4. The relief valve of claim 2, wherein the stem comprises a stem head having a circumference larger than a circumference of the stem, the stem defines at least two recesses, the one or more pins comprise at least two pins.

5. A relief valve capable of being coupled to a vessel, the relief valve comprising:
an inlet portion;
a stem;
a poppet comprising a valve seat and being coupled to the stem, the poppet movable between an open position where the valve seat is disengaged from the inlet portion to enable flow into the relief valve through the inlet portion, and a closed position where the valve seat is engaged to the inlet portion to prevent fluid flow into the relief valve through the inlet portion;
a spring configured to bias the poppet toward the closed position; and
a locking assembly configured to retain the poppet in the open position, the locking assembly comprising a pin with a first major longitudinal axis and a coiled pin spring with a second major longitudinal axis, the first major longitudinal axis being parallel to the second major longitudinal axis.

6. The relief valve of claim 1, wherein the locking assembly comprises a pin with a first major longitudinal axis and a coiled pin spring with a second major longitudinal axis, the first major longitudinal axis being parallel to the second major longitudinal axis.

7. The relief valve of claim 1, wherein the locking assembly comprises a pin configured to translate between a first position, where the pin does not interfere with movement of the poppet, and a second position, where the pin prevents the poppet from occupying the closed position, wherein the translation of the pin occurs in a single direction such that the first position of the pin is parallel to and collinear with the second position of the pin.

8. The relief valve of claim 1, wherein the locking assembly comprises a pin configured to move between a first position, where the pin does not interfere with movement of the poppet and a second position, where the pin prevents the poppet from occupying the closed position, wherein a length of the pin, defined along a major longitudinal axis of the pin, is greater than a diameter of the stem.

9. The relief valve of claim 8, wherein a reference line collinear with a major longitudinal axis of the pin does not intersect the stem.

10. The relief valve of claim 8, wherein the pin comprises a stop, the locking assembly comprises a plate, and the stop contacts the plate when the pin occupies the second position.

11. The relief valve of claim 8, wherein when the pin occupies the second position, the pin extends past a major longitudinal axis of the stem and when the pin occupies the first position, the pin does not extend past the major longitudinal axis of the stem.

12. The relief valve of claim 8, wherein the locking assembly comprises a pin groove with a major longitudinal axis, at least a portion of the pin is slideably disposed in the pin groove, and a length of the pin groove along the major longitudinal axis is greater than a diameter of the stem.

13. The relief valve of claim 12, wherein the locking assembly comprises a pin spring configured to bias the pin to the second position and a pin housing, through which the pin groove is defined, and the pin spring is disposed in the pin groove.

14. The relief valve of claim 13, wherein the pin housing encloses at least a portion of the stem and one end of the pin spring contacts, and compresses against, the pin housing.

15. The relief valve of claim 8, further comprising a valve bonnet at least partially defining an inner void, wherein the poppet and the bias member are disposed within the inner void.

16. The relief valve of claim 15, wherein the valve bonnet comprises the inlet portion.

17. The relief valve of claim 15, wherein when the poppet is in the open position, the bias member, the inlet portion, and the inner void are in fluid communication.

18. The relief valve of claim 15, wherein when the pin is in the second position, the pin does not contact the valve bonnet.

19. The relief valve of claim 1, wherein the inlet portion comprises a slanted surface angled such that a first perimeter of the slanted surface is greater than a second perimeter of the slanted surface, and the poppet, when occupying the closed position, contacts both the first perimeter of the slanted surface and the second perimeter of the slanted surface.

20. A pressurized system comprising:
the relief valve of claim 1, which further comprises an outlet;
a tank holding a pressurized fluid coupled to the inlet portion;
a low pressure destination in fluid communication with the outlet;
wherein the pressurized fluid has a greater pressure than a pressure of the low pressure destination.

21. The relief valve of claim 5, wherein the inlet portion comprises a slanted surface angled such that a first perimeter of the slanted surface is greater than a second perimeter of the slanted surface, and the poppet, when occupying the closed position, contacts both the first perimeter of the slanted surface and the second perimeter of the slanted surface.

22. A pressurized system comprising:
a relief valve, comprising:
an inlet portion;
an outlet;
a stem comprising a body portion and a head portion, the head portion being wider than the body portion;
a poppet coupled to the stem, the poppet being configured to occupy a plurality of open positions where the poppet is disengaged from the inlet portion to enable fluid flow through the inlet portion into the relief valve, and to occupy a closed position where the poppet engages the inlet portion to prevent fluid flow through the inlet portion into the relief valve;
a bias member configured to bias the poppet toward the closed position; and
a locking assembly comprising a pin configured to move between a first position, where the pin does not interfere with movement of the poppet and a second position, where the pin prevents the poppet from occupying the closed position, wherein a length of the pin, defined along a major longitudinal axis of the pin, is greater than a diameter of the head portion of the stem;
a tank holding a pressurized fluid coupled to the inlet portion; and
a low pressure destination in fluid communication with the outlet, wherein the pressurized fluid has a greater pressure than a pressure of the low pressure destination, such that when the poppet is disengaged from the inlet portion, fluid flows from the tank, through the relief valve, and into the low pressure destination.

* * * * *